US009167165B2

(12) United States Patent
Kuzdeba et al.

(10) Patent No.: US 9,167,165 B2
(45) Date of Patent: Oct. 20, 2015

(54) VISUAL COMMUNICATIONS SYSTEM EMPLOYING VIDEO IMAGERY

(71) Applicant: BAE Systems Information and Electronic Systems Integration Inc., Nashua, NH (US)

(72) Inventors: Scott A. Kuzdeba, Waltham, MA (US); Brandon P. Hombs, Merrimack, NH (US); Alexander M. Wyglinski, West Boylston, MA (US)

(73) Assignees: BAE Systems Information and Electronic Systems Integration Inc., Nashua, NH (US); Worchester Polytechnic Institute, Worcester, MA (US)

( * ) Notice: Subject to any disclaimer, the term of this patent is extended or adjusted under 35 U.S.C. 154(b) by 66 days.

(21) Appl. No.: 13/952,777

(22) Filed: Jul. 29, 2013

(65) Prior Publication Data
US 2014/0036103 A1 Feb. 6, 2014

Related U.S. Application Data

(60) Provisional application No. 61/742,081, filed on Aug. 1, 2012.

(51) Int. Cl.
G06K 19/06 (2006.01)
H04N 5/232 (2006.01)
G06K 7/14 (2006.01)

(52) U.S. Cl.
CPC .............. *H04N 5/23293* (2013.01); *G06K 7/14* (2013.01)

(58) Field of Classification Search
CPC .......... G06K 19/06065; G06K 7/1093; G06K 7/1417; G06K 17/30; G06K 17/30879; H04N 13/0434; H04N 13/021; H04N 13/0431; H04N 13/0239; H04N 2013/0081; H04N 13/0438; H04N 13/0402; G06F 17/30707; G06F 17/30861; G06F 19/10; G06F 19/28; G06F 19/322; G06F 19/3462; G06F 19/3487; G06F 2216/03; G06F 3/039; G06F 3/0416; G06F 3/044; G06F 3/0488; H04L 63/0227; H04L 63/105; H04L 63/20; H04L 67/1097; H04L 1/0048; H04L 51/12
See application file for complete search history.

(56) References Cited

U.S. PATENT DOCUMENTS

2005/0264694 A1\* 12/2005 Ilan et al. ...................... 348/473
2012/0181329 A1\* 7/2012 Gratton et al. ................ 235/375
2012/0211567 A1\* 8/2012 Herzig .......................... 235/488

OTHER PUBLICATIONS

Ashwin Ashok et al., Characterizing Multiplexing and Diversity in Visual MIMO, IEEE, 978-1-4244-9848-2/11.

(Continued)

*Primary Examiner* — Thien T Mai
(74) *Attorney, Agent, or Firm* — Daniel J. Long

(57) ABSTRACT

A system and method for platform independent LOS visual information transmission is disclosed. A transmitter consists of a series of sequential images that are stacked together to form frames in a video transmission. Each image is modulated spatially, by color, and by intensity. The data is transmitted over an LOS visual channel. The receiver first captures each individual image from the received video, and then demodulates each image in the three areas it was modulated spatially, by color, and by intensity. LOS visual information transmission allows for secure data transfer and reduces interference from other applications.

36 Claims, 10 Drawing Sheets

(56) References Cited

OTHER PUBLICATIONS

Samuel David Perli, Pixnet: Designing Interference-free Wireless Links using LCD-Camera Pairs, Department of Electrical Engineering and Computer Science, Jun. 2010.

Steve Hranilovic et al., A Pixelated MIMO Wireless Optical Communication System, IEEE Journal of Selected Topics in Quantum Electronics, vol. 12, No. 4, Jul./Aug. 2006.

Mitsuhiro Wada at al., Road-to-Vehicle Communication Using LED Traffic Light, Department of Electrical Engineering and Computer Science, IEEE, 0-7803-8961-1/2005.

E.G. Hamer, Theoretical Performance of Simple Multi-Channel Systems Using Frequency Modulation, Journal of the British Institution of Radio Engineers, Jul. 9, 1951.

Hyoungsik Nam et al., Analytic Solution to Remove Flickers on a Liquid Crystal Display Television, IEEE Transactions on Consumer Electronics, vol. 55, No. 2, May 2009.

Mario Kolberg et al., Trends in Consumer Communications: More Services and Media, Less Wires, IEEE Communications Magazine, Jun. 2010.

Jason D. Watson et al., Simulation and Analysis of Extended Brake Lights for Inter-Vehicle Communication Networks, IEEE 27th International Conference of Distributed Computing Systems Workshops, Apr. 2007.

T.D.C. Little et al., Using LED Lighting for Ubiquitous Indoor Wireless Networking, IEEE International Conference on Wireless & Mobile Computing, Networking & Communication, 978-0/7695-3393-3/2008.

* cited by examiner

VISUAL COMMUNICATIONS SYSTEM EMPLOYING VIDEO IMAGERY

CROSS-REFERENCE TO RELATED APPLICATIONS

This Application claims rights under 35 USC §119(e) from U.S. Application Ser. No. 61/742,081 filed 1 Aug. 2012 the contents of which are incorporated herein by reference.

TECHNICAL FIELD

Embodiments are generally related to communications. Embodiments are also related to visual communications employing video imagery. Embodiments are additionally related to a method and system for visible Line-Of-Sight (LOS) communications.

BACKGROUND OF THE INVENTION

As technology continues to reduce the size of electronic devices and make them more capable of performing multiple tasks, various forms of information transmission are finding their way into an increasing number of products and applications as disclosed in J. Boone, et al., "Wireless Technology Will Improve Life Quality," on a GroupT my statement blog, 2011; M. Kolberg, M. Merabti, S. Moyer, "Trends in Consumer Communications: More Services and Media, Less Wires," in IEEE Communications Magazine: June 2010; and A. Goldsmith, "Wireless Communications," Cambridge University Press., 2005.

In conjunction with this increase, the amount of available unlicensed wireless spectrum continues to shrink and the unlicensed bands are becoming more as disclosed in J. D, Watson, et al., "Simulation and Analysis of Extended Brake Lights for Inter-Vehicle Communication Networks," in Distributed Computing Systems Workshops 2007, 2007, Given the plethora of different standards and applications for these wireless technologies, electromagnetic (EM) interference from other users or protocols poses a serious risk. Furthermore, with an increasing number of wireless communication applications being implemented, the security of the transmitted data is rapidly becoming a serious concern for those trying to protect personal or sensitive information as seen in S. Bar-On, "Hi-Tech Heist," on CBS News and online at cbsnews.com, 2009 and A. Greenberg, "Hacker's Demo Shows How Easily Credit Cards Can Be Read Through Clothes And Wallets," 2012.

To address some of these problems, a new field of information transmission via visual communications has been emerging, where information is transmitted using the visual light spectrum. By using the visual light spectrum, spectrum licensing is no longer an issue. Additionally, interference from other users is drastically reduced over similar systems, due to the LOS visual channel that is used in such a system. This is a desirable feature for any form of information transmission for applications such as commercial transactions, surveillance/national defense and medical/health networks.

Research into visual communication offers the potential to solve some of the aforementioned issues, as shown in T. D. C. Little et al., "Using LED Lighting for Ubiquitous Indoor Wireless Networking," in IEEE International Conference on Wireless and Mobile. Computing, Networking and Communication, 2008; M. Wada et al., "Road-to-Vehicle Communication Using LED Traffic Light," in IEEE Intelligent Vehicles Symposium, 2005; and J. D. Watson, et al., "Simulation and Analysis of Extended Brake Lights for Inter-Vehicle Communication Networks," in Distributed Computing Systems Workshops 2007.

Direct visual communications through the use of imaging systems are also becoming more popular. Limited throughput information transmission systems have emerged from the widely deployed camera imaging systems built within mobile devices. Furthermore, limited amounts of data can now be transferred by (Quick Response) QR codes and 2D barcodes as disclosed in ISO. See Automatic identification and data capture techniques, QR code 2005 bar code symbology specification, ISO/IEC 18004:2006, 2006 and Automatic identification and data capture techniques, Data Matrix bar code symbology specification, ISO/IEC 16022:2006.

Expanding visual communications to leverage video imaging systems is something that is beginning to be explored as disclosed in S. Hranilovic, Kschischang, "A Pixelated MIMO Wireless Optical Communication System," in IEEE Journal of Selected Topics in Quantum Electronics, Vol. 12, No. 4, 2006; A. Ashok, et al., "Characterizing Multiplexing and Diversity in Visual MIMO," in 45th Annual Conference on Information Sciences and Systems (CISS): 2011, 2011; and S. D. Perli, "Pixnet: Designing interference-free Wireless Links using LCD-Camera Pairs," submitted to Department of Electrical Engineering and Computer Science, Massachusetts Institute of Technology, 2010.

Video communication systems sequentially process stacks of images in order to make up frames of a video that can transmit far more data. For instance, the pixilated MIMO method employs a digital camera to receive a video stack of pixilated images from a computer screen with a focus primarily on the channel used in such communications. Similar work, a concept called "Visual MIMO", expanded the general approach presented in by noting that, most of the distortion in such a system would not come from the channel, but instead from the perspective distortions in the receiver. Further work in the development of a system called Pixnet looked into a similar approach of using LCD screens as a transmitter and cameras as receivers with the focus on trying to maximize throughput, while mitigating distortions and losses due to multi-meter distances and off center viewing angles.

These research activities demonstrate the capabilities of visual information transmission systems and present potential uses for them, but are limited to the hardware that can be used in such a system. With video cameras built into most mobile electronic devices, the viability of turning any of these devices into a visual communications receiver with only a software package has yet to be investigated. Furthermore, these devices as well as many other devices have a digital screen to display graphics, making many devices candidates for transmitters. Much of the analysis into the transmission distance and reception area explored in previous research efforts can also be mitigated by requiring closer range communication between devices, similar to the requirements of QR codes.

A need, therefore, exists for an improved method and system for visible LOS communications.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the present invention to provide for communications.

It is another aspect of the disclosed embodiment to provide for visual communications employing video imagery.

It is a further aspect of the disclosed embodiment to provide to a method and system for visible LOS communications.

The aforementioned aspects and other objectives and advantages can now be achieved as described herein. A system and method for platform independent LOS visual information transmission is disclosed, Information transmission through the use of video imagining systems has the potential to build upon the success of imaging communication systems, such as QR Codes and 2D Barcodes. Video communication systems add a temporal dimension to image-based information transmission systems, greatly expanding the amount of data that can be transferred. Such a system allows for secure transfer of data through the use of a line-of-sight (LOS) visual channel, making it attractive for several applications including in-store purchases, banking, and stealth military missions. The nature of the LOS visual channel also reduces interference from other applications, making it a very attractive option for implementing short range communications systems from a cell phone, computer, tablet, or other device.

With the rise of video imaging equipment in many types of devices and the recent popularity of QR codes and 2D barcodes, the invention can be realized in numerous applications. Furthermore, the invention is well suited for secure applications where LOS visual communication posses significant potential with respect to more secure data transfer relative to current RF systems. Several potential applications that could benefit from the invention include an alternative to in-store credit card purchases, ATM and banking transactions, peer-to-peer data transfers, communication in areas where RF signals are banned (such as hospitals), and military communications in the cover of RF radio silence.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

I. SYSTEM FRAMEWORK

Figure 1:
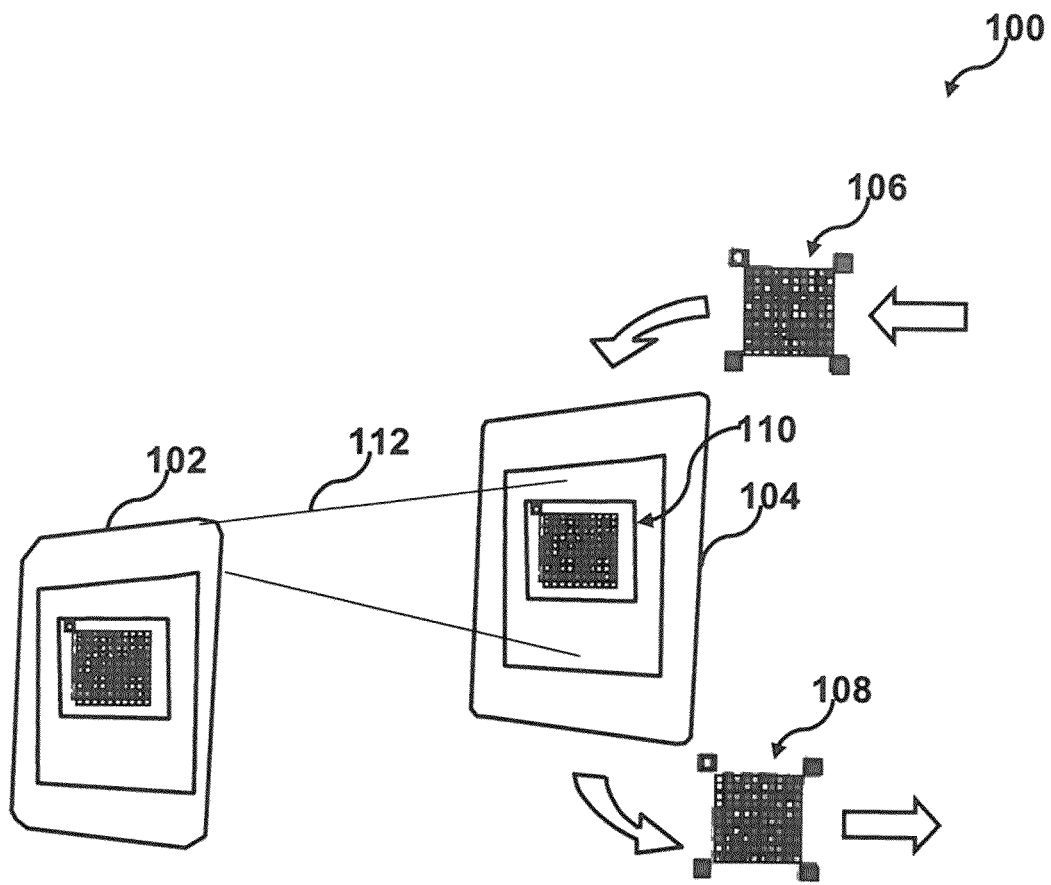
FIG. 1 illustrates a schematic diagram of a LOS visual information transmission system, in accordance with the disclosed embodiments.

Referring to FIG. 1 a schematic diagram of a LOS visual information transmission system 100 is disclosed. The transmitter 104 is made up of a data projection device, such as a computer monitor, projector, or tablet/cell phone screen. To capture the digital video transmissions, the receiver 102 is a video camera, which could be found in such devices as cell phones, tablets, or webcams, as shown in FIG. 1. The transmitter 104 consists of a series of sequential images that are stacked together to form frames 106, 108 and 110 in a video transmission. Data is modulated into a series of frames 106, 108 and 110 that are played across a digital screen. The data is transmitted aver an LOS visual channel 112. A camera in the receiver 102 captures and decodes the data.

The receiver 102 first captures each individual image from the received video, and then demodulates each image in the three areas it was modulated; spatially, by color, and by intensity. Note that the system 100 takes the traditional antenna in a wireless communication system and replaces the RF component with video imaging system components. Also note that the frames 106, 108 and 110 represent frames N+1, N−1 and N respectively.

Figure 2:
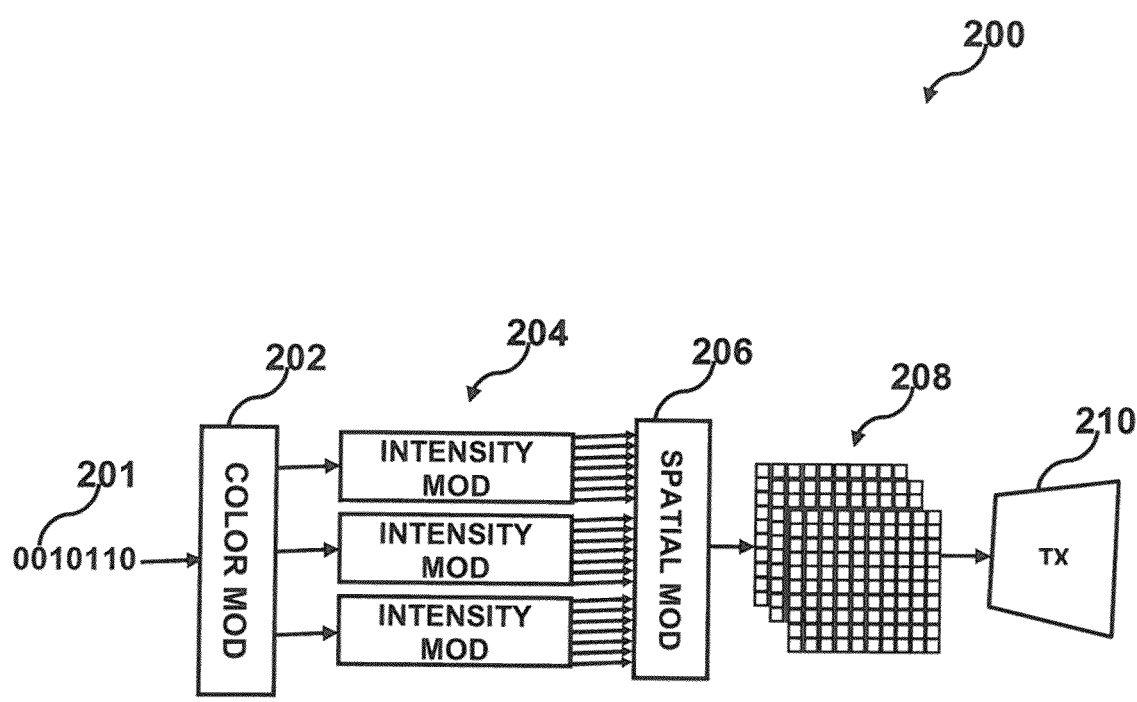
FIG. 2 illustrates a block diagram of a transmitter chain utilized in system of FIG. 1, in accordance with the disclosed embodiments.

FIG. 2 illustrates a block diagram of a transmitter chain 200 utilized in system 100 of FIG. 1. The input binary stream 201 to be transmitted is a binary stream modulated to three colors frequencies by means similar to demultiplexing for example a three color modulator 202. Within each color frequency, k data bits are modulated to $\log_2(k)$ intensity levels, by utilizing intensity modulators 204 similar to multi-bit quantizing. Intensity values for three color frequencies collected and spatially modulated to an area of the image by utilizing spatial modulator 206. Color, intensity and spatial modulation are continued until image is filled and then process is repeated, stacking images/frames 208 into a video 210. Video 210 of images is transmitted by data projection device over visual light channel.

A. Transmitter

The channel used in the system is a visual channel. Within this channel, color can be used to modulate data. The most basic form of transmission that can be used here is a binary or an ON/OFF keying scheme, where a single pair of colors is used. For example, using black and white as the single pair of colors, transmitting a binary 1 can be done by transmitting a black image, and a white image can be used for a binary 0.

Since the vast majority of digital projection devices have the capability to use more than a single color pair, using multiple colors can easily allow for larger data throughput. Each color can be used in an on/off sense, such as the black/white example discussed above. Thus, each color can be used to transmit a single bit, as in Equation (1) in Table I, where k is the number of bits transmitted per image and C is the number of colors used. Here, C can be thought of in a couple of ways. It could be a color pair, such as black/white when considering all colors, or it could be the presence or absence of a specific color, such as red.

With most devices running or capable of running off of RGB video inputs and outputs, using these three colors for modulation provides a viable solution. Furthermore, since these three colors/frequencies are orthogonal, this provides with several useful properties in using such a color scheme. The RGB input/output video imaging color scheme is what was used in the system discussed below.

To add several more degrees of freedom to the system and allow for the transmission of more data, different color intensity levels can be used, by utilizing color modulator 202 as depicted in FIG. 2. The intensity levels of a color can be broken up in whichever way is deemed most fit or appropriate for the given application. In the system implementation, the intensity levels were broken up linearly. However, gains could have been made by using something more similar to an exponential scaling of the intensity levels as is disclosed in E. G. Hamer, "Theoretical Performance of Simple Multi-Channel Systems Using Frequency Modulation," in Journal of the British Institution of Radio Engineers, 1952 the contents of which are incorporated herein by reference, since in the system, colors were more biased towards the white end of the spectrum than the black end.

With the use of color intensity, the amount of data that can be transmitted in a single image is increased to Equation (2) in Table I, where L is the number of intensity levels per color (assuming that each color uses the same number of intensity levels). In the case of a RGB system with 16 intensity levels, this results in 12 bits being transmitted per image.

Figure 4:
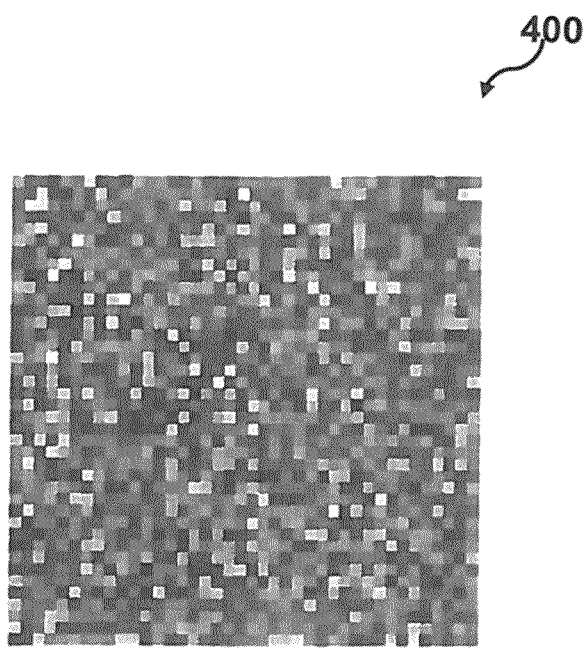
FIG. 4 illustrates an example of single image containing 19,200 bits to be transmitted, in accordance with the disclosed embodiments.

Since the transmitter is a digital projection device and the receiver is a camera, there are also inherent spatial elements that can be used for modulating data, which is represented in spatial modulator 206 as depicted in FIG. 2. The available transmit area $A_T$ can be subdivided into smaller elements $a_T$, where each element can be used to transmit data through the use of colors and intensities as discussed above. The number of bits per image, k, that can be transmitted is Equation (3) in Table I. The prototype discussed below used a square pattern to subdivide the transmit area $A_T$ into $a_T$ elements. With 40 elements per side in a square transmit area and 16 color intensities for an RGB system, this results is 19,200 bits/image. An example of such an image 400 is shown in FIG. 4.

This creates the modulation for a single image to be transmitted, much like that of a 2D barcode, with the added capabilities of different colors, color intensities, and flexibility in subdividing the transmission area, $A_T$. In order to pack in more data and make this a relatively competitive wireless data transmission system, the data throughput needs to be increased. This is done through the use of a temporal element. The transmitter so far has only created a single image, which has a limited amount of information. To transmit larger data loads, these images are stacked back to back in order to create frames 208 in a video 210. Their speed is controlled by the frame rate of the video, RE. Note that the term frame and image can be used interchangeably in this application. The data rate of the system is obtained using Equation (4) in Table I. Continuing the example from above (16 color intensities, RGB color scheme, and a 40×40 element transmission square, for a frame rate of $R_F$=30 frames/second the data rate of the system is $R_k$=576 Kbits/second.

TABLE I

EQUATIONS CHARACTERIZING THROUGHPUT

| Eq. # | Description | Equation |
| --- | --- | --- |
| (1) | Bits/frame from color Modulation | $K = C$ |
| (2) | Bits/frame with Intensity modulation | $K = C\log_2 L$ |
| (3) | Bits/frame with Spatial Modulation | $K = a_T C\log_2 L$ |
| (4) | Uncoded Data Rate | $R_k = a_T C\log_2 L R_F$ |

B. Receiver

The receiver must capture the transmitted image, decompose it down into the images sent, and then determine the spatial and color intensities. The first challenge is to determine which frames of the captured video correspond to the transmitted images. In a practical system, it is unlikely that the different video processing devices employed in different platforms will have the same frame rates. In order to make the system robust and capable of working across existing platforms without the need for infrastructure switch-outs, the receiver needs to be able to take care of determining the transmitted images from all the frames captured in the received video stream.

Since different frame rates means that frame synchronization may not be possible, other methods of determining the images must be used. The method implemented will have to be able to handle this lack of synchronization, as well as other problems that arise in a video imaging system, such as interleave refreshing in the projection (i.e. transmitting) device as is disclosed in H. Nam, K Y Oh, S W Lee, "Analytic Solution to Remove Flickers on a Liquid Crystal Display Television," in IEEE Transactions on Consumer Electronics, 2009 the contents of which are incorporated herein by reference. The implemented system used a changing border scheme to determine the images transmitted.

Figure 5:
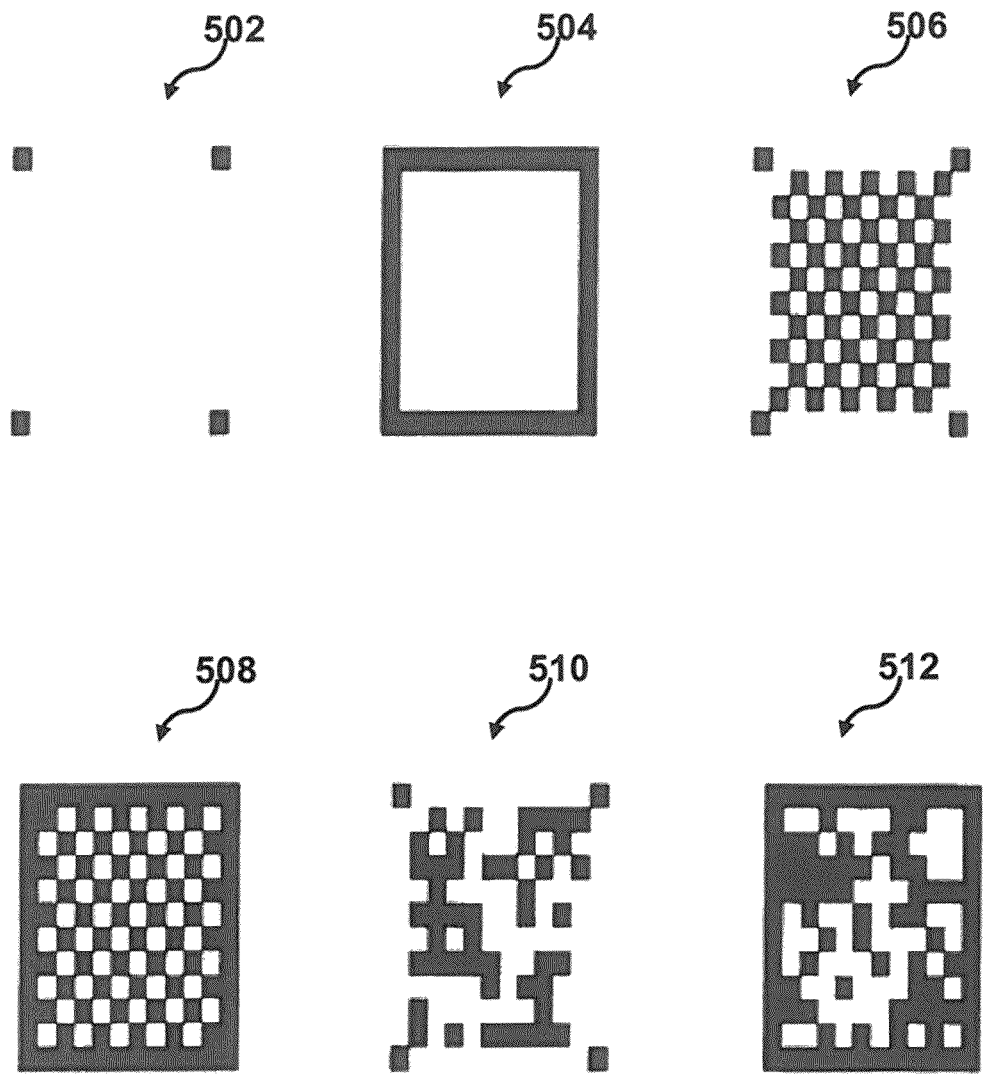
FIG. 5 illustrates a several custom images showing an example sequence of visual data transmission from a transmitter to a receiver, including a border that switches on every transmit frame for frame retrieval, in accordance with the disclosed embodiments.

Detecting the different transmitted frames is done through a changing border scheme. Each transmitted frame is surrounded by a unique border. The border was black or white (making up the area between the anchors) and changed on every successive transmitted frame as shown in FIG. 5, Using the changing border scheme solves a couple issues faced in a dynamic system. Assuming that the system can be used across many different systems, the changing border scheme frees the receiver of the requirement of knowing the transmitter frame rate, as the changing border scheme can be used to detect the transmitter frame transitions, and thus the transmitted frame rate.

Additionally, using the border helps alleviate the problem of getting received frames that consist of "transition" frames (partial frames from multiple transmit frames due to the way the transmitter screen refreshes/interleaves). Received frames that contain a consistent border (above some threshold) are kept and used in the decoding. Received frames that contain parts of borders from multiple transmitted frames (as in the simple example of the top half of the frame has a white border and the bottom half has a black border) can either be discarded or intelligently used in the decoding.

Once an estimate of a transmitted image is determined, the spatial modulated areas, $a_T$ must be determined as said at block 312. With the assumption that the receiver knows the general shape used by the transmitter, the receiver can make an estimate of the layout of image areas, $a_T$. This estimate can be updated with training data sent at the beginning of the transmission.

Figure 3:
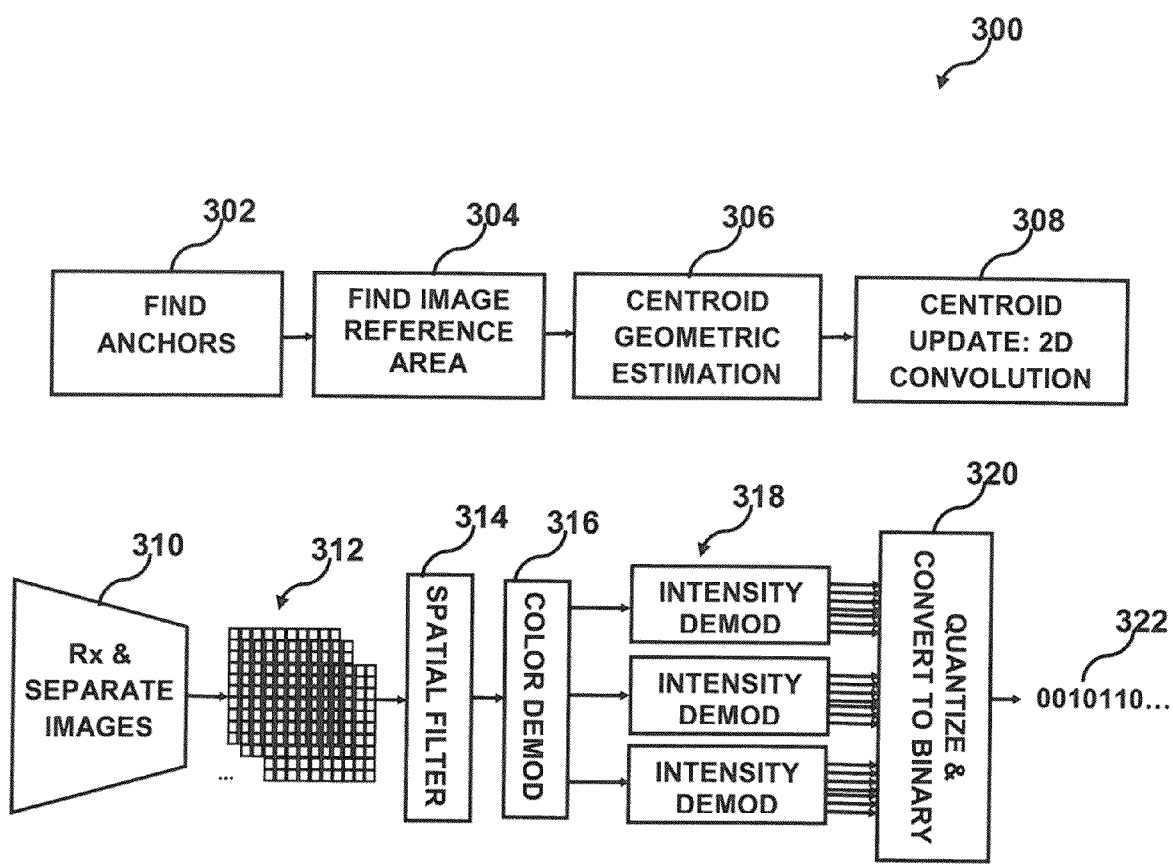
FIG. 3 illustrates a block diagram of a receiver chain utilized in system of FIG. 1, in accordance with the disclosed embodiments.

Referring to FIG. 3 a block diagram of a receiver chain 300 is disclosed. As said at block 302 and 304, corner anchors used for image registration are found and image reference areas used for pulling individual images out of video are located. Then, the centroids of spatially modulated areas, $a_T$ are estimated and updates are made to centroid locations as illustrated at block 306 and 308 respectively.

In data recovery, the receiver obtains transmitted video and pulls apart individual images as depicted at block 310. Then, single images are spatially demodulated and spatial results are filtered to correct for receiver distortion as said at block 312 and 314. As illustrated at block 316, 318 and 320, each spatial area, $a_T$ is demodulated into three color frequencies and the result is demodulated in each color for intensity, similar to dequantizing (k) data collected and turned into received binary data stream 322 showing a system 100 depicted in FIG. 1. The update can use a form of 2D convolution or correlation as said at block 308. Once the individual spatial modulated areas, $a_T$, are estimated, the receiver must then decode the information contained within each area. Decoding is performed by determining the color frequencies contained within a region, $a_T$, and then determining the intensity corresponding to each color. The training data can be transmitted and used to adaptively set threshold levels for colors and intensities.

Once the data stored within each color, intensity, and spatial region $a_T$ is demodulated, the data is then collected back into a binary data stream 322 as the estimate of the data transmitted. Note that the input binary stream 201 in FIG. 2 transmitted in transmission chain 200 is received as binary data stream 322 in receiver chain 300.

FIG. 4 is an example of a single image 400 containing 19,200 bits to be transmitted. In such image 400, the color modulation uses RGB color scheme, intensity modulation uses 16 intensity levels per color and spatial modulation uses a square of 40×40 elements.

II. EXPERIMENTAL PROTOTYPE

A prototype of the system was designed and implemented with the use of a webcam and a computer monitor. The transmitted data was generated by creating a video of MATLAB images. A webcam was then used to capture the transmitted video, which was played on a LCD monitor. The video captured from the webcam was then fed back into MATLAB to be decoded in near real-time.

A. Transmitter

Two types of transmitted images were generated, 1) images containing training data and 2) images containing the desired transmit information. Training data was transmitted first, allowing the receiver to determine the transmit area, $A_T$, the spatially modulated regions, $a_T$, and the frame rate (or image transition points) that are used. In FIG. 5, the reference numerals 502, 504, 506 and 508 shows the training data that was sent. The data was then transmitted following the training period, In FIG. 5, the reference numerals 510 and 512 show two sequential data images. All training and information was modulated into a square grid pattern of spatially modulated regions. Analysis considered both black/white (BW) and red/green/blue (RGB) transmissions as well as a variety of intensity levels, as discussed in the results section.

FIG. 5 shows several custom images created to form an example sequence of visual data transmission from a transmitter to a receiver. The image 502 represents first image sent containing image anchors for acquiring image area $A_T$, image 504 represents second image sent containing image registration area, image 506 represents image used to acquire spatial areas $a_T$ and centroid updates, image 508 represents image used for further centroid updates, image 510 represents image containing example BW modulated data, and image 512 represents an example next image as determined by changed border.

B. Receiver—Image Registration

The receiver first determines the transmit area, $A_T$. In order to determine transmit area, four anchors were used. The transmission starts with the projection area being all white except for the black anchors, as shown in training data 502, in FIG. 5. The receiver takes in the first several frames it gets to find the location of the anchors. The receiver then specifies the polygon made by the inner corner of each anchor to be $A_T$.

Once $A_T$ is found, the receiver determines how each image will be registered. To separate the images, a novel on-off switching border is used in the video as shown in training data 504, depicted in FIG. 5. The border fills in the area between the anchors, surrounding $A_T$. For each new image in the transmitter, this image registration area, $A_r$, changes colors between black and white. $A_r$ remains the same color throughout the frames of an image and changes on each image iteration. In this manner, the receiver uses a threshold value set during training to determine which received frames are part of which images. The receiver collects frames that are part of the same image and uses an average of them for an estimate of the transmitted image, although other methods besides averaging could be used to better capture the information sent. Any received frames that occur during transitions between images that do not meet the thresholds set for $A_r$ are discarded.

C. Receiver—Spatial Demodulation

The spatial modulation regions, $a_T$, are squares contained within a grid. The receiver first starts off with an estimate of the locations of the centers of each $a_T$, the centroids. The centroids are initially calculated based off the geometry of the polygon created from the inner corner of the anchors. The centroids are the locations, where evenly spaced lines connecting the sides intersect the lines connecting top and bottom. The boundaries of each $a_T$ is determined to be the midpoint between the four adjacent $a_T$.

During training, a grid of alternating BW squares is transmitted for use in the $a_T$ update as shown. Once the image with the grid is received, the initial centroid locations are used to determine the estimate of the center of each $a_T$. A 2-dimensional convolution (or correlation) is then performed in the vicinity (within one adjacent $a_T$) around each centroid to update the center point to the maximum convolved location:

$$\hat{a}_{aT} = \underset{x,y}{\operatorname{argmax}}\{h(x, y) \cdot f(x, y)\} \tag{1}$$

$$\hat{a}_{aT} = \underset{x,y}{\operatorname{argmax}}\left\{\sum_{s=-a}^{a}\sum_{t=-b}^{b} h(s, t)f(x-s, y-t)\right\} \tag{2}$$

where $\hat{a}_T$ is an estimated centroid. To speed up processing time, the prototype uses adaptive regions of multiple $a_T$ at once in the convolution. In the results presented below, the convolution used for this update was fixed to be a 5×5 grid (based off a factor of the size of the $A_T$ grid). An example of this is shown in FIG. 6.

Figure 6:
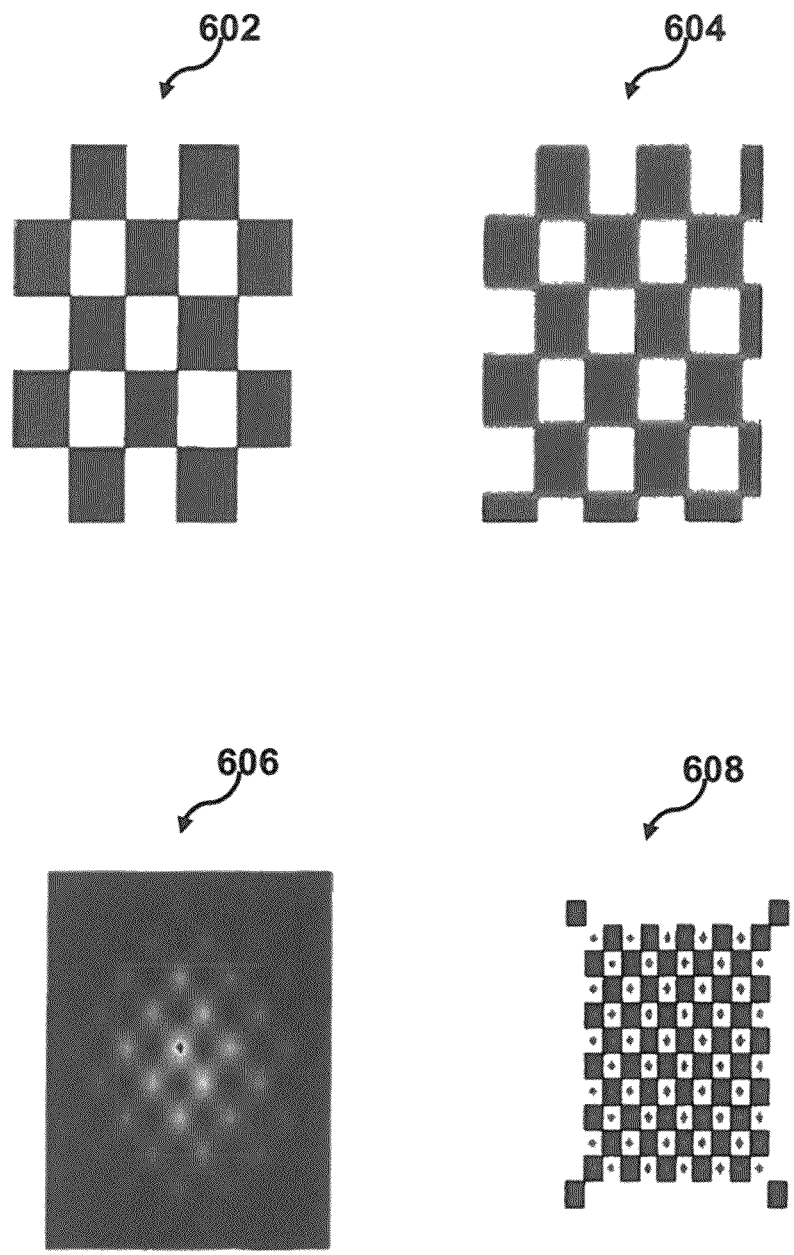
FIG. 6 illustrates an example of updating the centroid locations, in accordance with the disclosed embodiments.

FIG. 6 shows an example of updating the centroid locations. The image 602 represents 5×5 convolution template, image 604 represents image section for centroid updates, image 606 represents resulting 2D convolution with the areas of interest outlined, and image 608 represents an example centroid updated locations.

D. Receiver—Color Demodulation

Now that the receiver can capture the individual images and estimate the location of all $a_T$'s, the receiver now decodes the color intensities within each $a_T$ to get the binary information stream. $a_T$ is assumed to be a square, with its edge boundaries being the midpoints between adjacent $a_T$. With this set up, it is expected that the area near the boundaries contain some blurring from the adjacent $a_T$, while the center of $a_T$ would be expected to contain the best color estimate. A 2-dimensional Gaussian filter was then used on each $a_T$, giving more weight to the center of $a_T$ than to its boundaries.

$$\omega(x \mid \mu, \Sigma) = \frac{1}{2\pi\sqrt{|\Sigma|}} e^{-1/2(x-\mu)\Sigma^{-1}(x-\mu)'} \quad (3)$$

Figure 7:
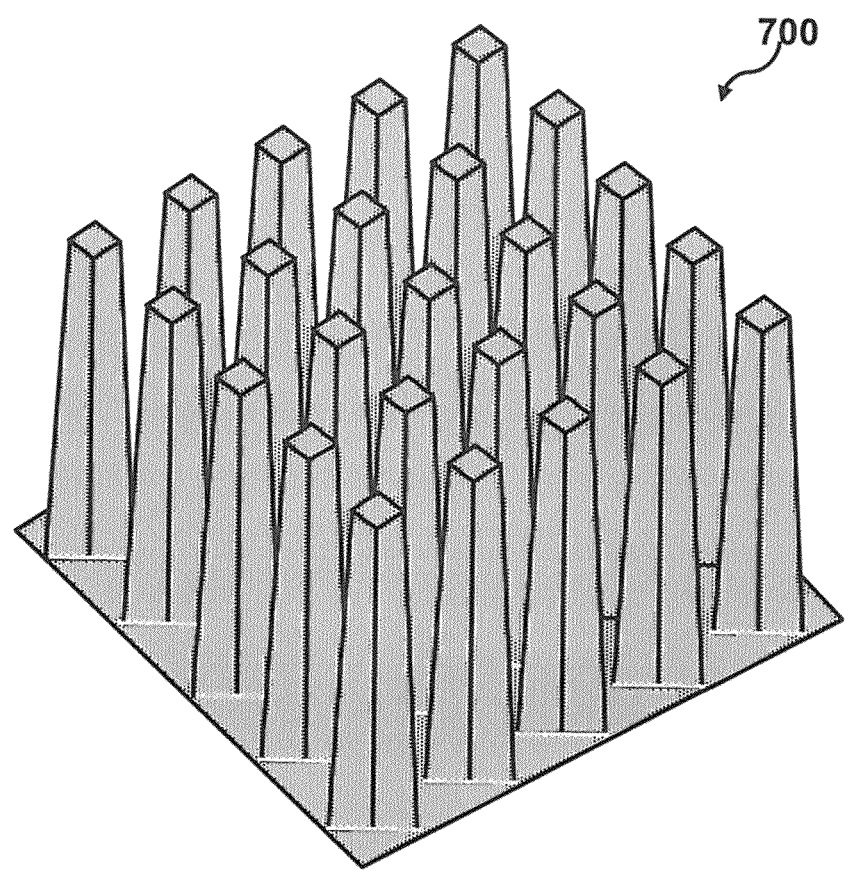
FIG. 7 illustrates an example of 5×5 area of Gaussian spatial filters that could be used in receiver, in accordance with the disclosed embodiments.

An example of a 5×5 area 700 of Gaussian filters is shown in FIG. 7. This spatial filtering is a method used to help correct for some of the largest distortions of the system, which are distortions due to receiver video capturing errors. As said at block 314, the spatial filtering is seen in the receiver chain 300 in FIG. 3.

The Gaussian filter as in Equation (3) & spatial filtering as depicted at block 314 in FIG. 3 is applied to each $a_T$ and the result is normalized to determine the color value that should be associated with $a_T$.

$$I_{aT} = \frac{\sum_{i=-\frac{N}{2}}^{\frac{N}{2}} \sum_{j=-\frac{M}{2}}^{\frac{M}{2}} \omega(i,j) f(i,j)}{\overline{\omega}} \quad (4)$$

where $Ia_T$ is the estimated transmitted color value for a given $a_T$ in the image f entered at location i, j. If intensity modulation is used, the result of this filtering is then quantized by the L intensity levels and the resulting image is converted to binary numbers as said at block 316 in FIG. 3 as an estimate of the transmitted bits:

$$b = \left[ \frac{I_{aT}}{255/L} \right] \quad (5)$$

where h is the estimated transmitted binary bit(s) (assuming 255 color levels are used in the image), which make up the binary stream as depicted at block 320 in FIG. 3.

IV. EXPERIMENTAL RESULTS

Figure 8:
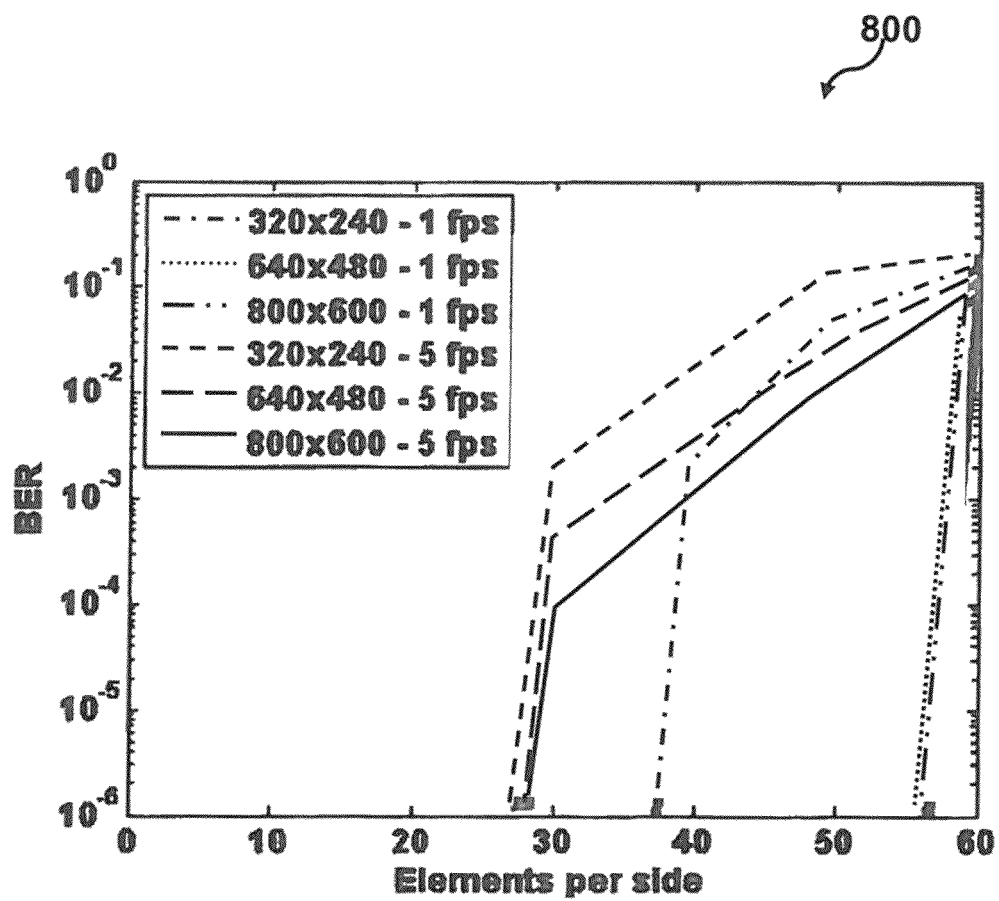
FIG. 8 illustrates a graph showing Bit Error Rate (BER) for various Black/White (BW) transmissions schemes from the results of an early prototype, in accordance with the disclosed embodiments.

FIG. 8 is a graph 800 showing the bit error rate (BER) of different configurations under a BW color scheme. The configurations were different combinations of frame rates (1 or 5 frame per second, fps), elements per side (1 to 60), and receive camera resolutions (320×240, 640×480, or 800×600). As can be seen, there was very little or no loss of data until there was 30 elements per side. After this point, the higher frame rates and lower resolutions start to result in a higher BER. The BER of the higher frame rates is seen to remain far lower than that of lower frame rates, especially in the slower rate.

Figure 9:
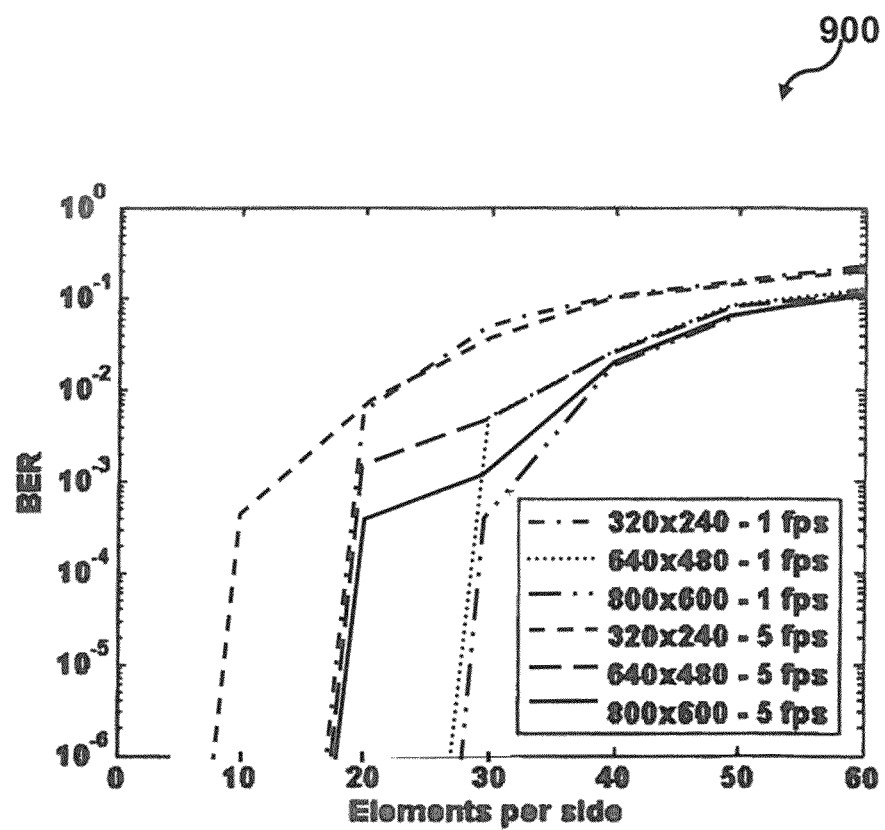
FIG. 9 illustrates a graph showing BER for various Red/Green/Blue (RGB) transmissions schemes from the results of an early prototype, in accordance with the disclosed embodiments.

FIG. 9 is a graph 900 showing similar results, except using an RGB color scheme instead of BW. Colors represent different camera resolutions and line types represent different transmitted frame rates. The x-axis displays the number of elements on one side of a transmitted square grid of elements. This increases the number of bits per $a_T$ from 1 to 3, Similar trends are seen here, but with BER reaching higher levels than comparable BW setups. It is also notable that in large element schemes, BER is fairly similar amongst the different frame rates considered.

Figure 10:
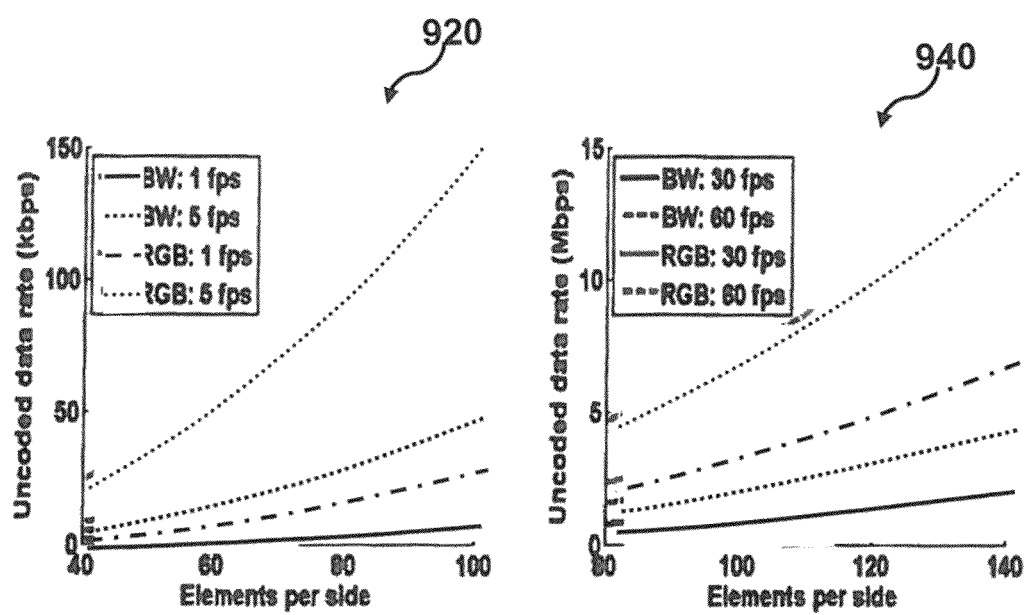
FIG. 10 illustrates graphs showing projected encoded data rates for various BW and RGB transmission schemes, in accordance with the disclosed embodiments.

FIG. 10 includes graphs 920 and 940 showing uncoded data rates. The graph 920 displays the corresponding uncoded data transmission rates to the results presented in FIG. 8 and FIG. 9. As expected, the difference between RGB data rates and BW data rates is a factor of three. The maximum frame rate from the study was about 55 kbps for an RGB transmission with sixty elements per side, but the BER under this scenario was as high as 15%. The graph 940 displays what the uncoded data rate would be under different configurations that are thought to be attainable. The resolutions used were the three lowest resolutions supported by the webcam, so it would be expected that switching to higher resolutions would support larger element schemes (many mobile devices support higher resolutions as well). Also factored into these rates are faster frame rates (which have been proven possible on other devices but not yet tested under this configuration) and intensity modulation (which has been shown to work on cameras within mobile devices, but was difficult to obtain with the webcam used in this study). Rates under these conditions are seen to reach into the Mbps range, making them a viable option for various LOS communication applications.

IV. CONCLUSIONS

Those skilled in the art will appreciate that this invention provides a method for using video imaging systems to effectively perform wireless communications. With the growing use of mobile devices and video cameras embedded within consumer electronics, this invention has numerous applications for providing secure, unlicensed, point-to-point information communication.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for visual Line-Of-Sight (LOS) communications comprising:
   receiving a bit stream by a transmitter;
   modulating the bit stream into a series of images, wherein modulating the bit stream comprises:
     modulating a predefined number of bits of the bit stream to one or more colors;

modulating each color to a predetermined number of intensity levels; and spatially modulating the intensity levels; and sequentially stacking the series of images to form a plurality of frames in a video transmission; wherein modulating each color to a predetermined number of intensity levels comprises of modulating each color to $\log_2 L$ intensity levels, wherein L is the predetermined number of intensity levels for each color.

2. The method of claim 1 further comprises surrounding each of said frames by a border that changes from black color to white color and from white color to black color on every successive transmitted frame.

3. The method of claim 2 further comprises capturing each individual image from a received video by a receiver comprising a video camera to receive said video;

demodulating each image spatially, by color, and by intensity; and quantizing and converting the demodulated image to binary for retrieving the bit stream.

4. The method of claim 1 wherein the transmitter displays the video transmission having the series of images.

5. The method of claim 4 wherein said transmitter comprises a data projection device.

6. The method of claim 2 wherein said border fills area between one or more anchors of each of the plurality of frames.

7. The method of claim 3, wherein said receiver decodes each of said frames that contain said border.

8. The method of claim 2, wherein said border is utilized to detect a transmitter frame rate.

9. The method of claim 3, wherein said receiver uses a threshold value set during training to determine one or more images corresponding to one or more received frames.

10. The method of claim 9, wherein said receiver collects the one or more frames and uses an average of the collected frames for an estimate of transmitted image.

11. A method for visual Line-Of-Sight (LOS) communications comprising:

receiving a bit stream by a transmitter;

modulating the bit stream into a series of images, wherein modulating the bit stream comprises;

modulating a predefined number of bits of the bit stream to one or more colors;

modulating each color to a predetermined number of intensity levels; and spatially modulating the intensity levels;

sequentially stacking the series of images for providing a series of sequential images to form a plurality of frames in a video transmission;

capturing the video transmission from the transmitter by a receiver over a Line-Of-Sight visual channel:

detecting one or more frame of the received video transmission;

determining the series of images from the detected one or more frames of the received video transmission;

demodulating the series of images, wherein the demodulation comprises:

spatially demodulating each image of the series of images for retrieving one or more spatial areas;

demodulating each of the one or more spatial areas into one or more color frequencies;

demodulating each of the one or more color frequencies into one or more intensity levels; and quantizing and converting the demodulated image to binary for retrieving the bit stream; wherein modulating each color to a predetermined number of intensity levels comprises of modulating each color to $\log_2 L$ intensity levels, wherein L is the predetermined number of intensity levels for each color.

12. The method of claim 11 wherein said transmitter comprises a data projection device and said receiver comprises a video camera to capture said video transmission.

13. The method of claim 11, wherein a border fills area between one or more anchors of each of the plurality of frames.

14. The method of claim 13 wherein said receiver decodes each of the plurality of frames that contain said border.

15. The method of claim 13 wherein said border is utilized to detect a transmitter frame rate.

16. The method of claim 11 wherein said receiver uses a threshold value set during training to determine one or more images corresponding to one or more detected frames.

17. The method of claim 16 wherein said receiver collects the one or more frames and uses an average of the collected one or more frames for an estimate of transmitted image.

18. A system for visual Line-Of-Sight (LOS) communications comprising:

a transmitter for providing a series of sequential images that are stacked together to form a plurality of frames in a video transmission, wherein said transmitter is configured for modulating a predefined number of bits of the bit stream to one or more colors;

modulating each color to a predetermined number of intensity levels; and spatially modulating the intensity levels; and a receiver for capturing the video transmission from the transmitter over a Line-Of-Sight visual channel, for demodulating each image spatially, by color, and by intensity; and for quantizing and converting the demodulated image to binary for retrieving the bit stream; wherein modulating each color to a predetermined number of intensity levels comprises of modulating each color to $\log_2 L$ intensity levels, wherein L is the predetermined number of intensity levels for each color.

19. The system of claim 18 wherein the transmitter comprises of a data projection device for displaying the video transmission.

20. The system of claim 18 wherein said receiver comprises a video camera to capture said video transmission.

21. The system of claim 18, wherein a border fills area between one or more anchors of each of the plurality of frames.

22. The system of claim 21 wherein said receiver decodes each of the plurality of frames that contain said border.

23. The system of claim 21 wherein said border is utilized to detect a transmitter frame rate.

24. The system of claim 18 wherein said receiver uses a threshold value set during training to determine one or more images corresponding to one or more received frames.

25. The system of claim 24 wherein said receiver collects one or more frames and uses an average of the collected one or more frames for an estimate of transmitted image.

26. A method for determining transmitted data comprising:

receiving a video transmission by a receiver by means of a camera, wherein the video transmission comprises of a sequence of a plurality of frames;

detecting each frame of the plurality of frames;

determining a series of images from the detected plurality of frames of the received video transmission;

demodulating the series of images, wherein the demodulation comprises spatially demodulating each image of the series of images for retrieving one or more spatial areas;

demodulating each of the one or more spatial areas into one or more color frequencies; and demodulating each of the one or more color frequencies into one or more intensity levels; and quantizing and converting the demodulated image to binary for retrieving a bit stream; wherein modulating each color to a predetermined number of intensity levels comprises of modulating each color to $\log_2 L$ intensity levels, wherein L is the predetermined number of intensity levels for each color.

27. The method of claim 26 wherein the step of detecting each frame of the plurality of frames comprises of detecting a change in a border of the plurality of frames wherein the border changes from black color to white color and from white color to black color on every successive frame.

28. The method of claim 26 wherein said receiver uses a threshold value set during training to determine the one or more images corresponding to the one or more received frames.

29. The method of claim 26 wherein said receiver uses an average of collected one or more frames for determining each image of the series of images.

30. The method of claim 1 wherein the one or more colors are orthogonal to each other.

31. The method of claim 1 wherein the step of sequentially stacking the series of images is based on a predefined frame rate.

32. The method of claim 11 wherein the one or more colors are orthogonal to each other.

33. The method of claim 11 wherein the step of sequentially stacking the series of images is based on a predefined frame rate.

34. The method of claim 11 wherein the step of sequentially stacking the series of images comprises surrounding each of said frames by a border that changes from black color to white color and from white color to black color on every successive transmitted frame.

35. The method of claim 26 wherein the one or more colors are orthogonal to each other.

36. The method of claim 27 wherein said border fills area between one or more anchors of each of the plurality of frames.

* * * * *